July 13, 1943. E. F. DAVIS Re. 22,346

METHOD OF CARBURIZING

Original Filed Jan. 2, 1940

Inventor:
Ernest F. Davis
By: Edward C. Gritzbaugh
Atty.

Reissued July 13, 1943

Re. 22,346

UNITED STATES PATENT OFFICE 22,346

METHOD OF CARBURIZING

Ernest F. Davis, Muncie, Ind., assignor to Borg-Warner Corporation, Chicago, Ill., a corporation of Illinois Original No. 2,275,133, dated March 3, 1942, Serial No. 312,020, January 2, 1940. Application for reissue April 30, 1942, Serial No. 441,147

3 Claims. (Cl. 148—14)

This invention relates to the carburizing of gears and other articles of steel having bores, and has as its object to provide a method whereby the teeth and other external areas of the gears may be hardened while the bores are maintained in an annealed state.

More specifically, the invention contemplates a carburizing method wherein the bores of the articles are packed or lined with a material adapted to inhibit the carburizing action in the vicinity of the bore surfaces, without affecting the carburizing action on the external surfaces.

One of the problems that has been encountered in the development of the invention is that of confining the inhibiting effect to the regions that are to be maintained in an annealed condition. An important object of the invention, therefore, is to provide a method whereby the external surfaces may be fully and uniformly hardened while the hub bores are maintained in a soft condition.

Other objects, the advantages and uses of the invention will become more apparent after reading the following specification and claims, and after consideration of the drawing forming a part of the specification, wherein:

Figure 1:
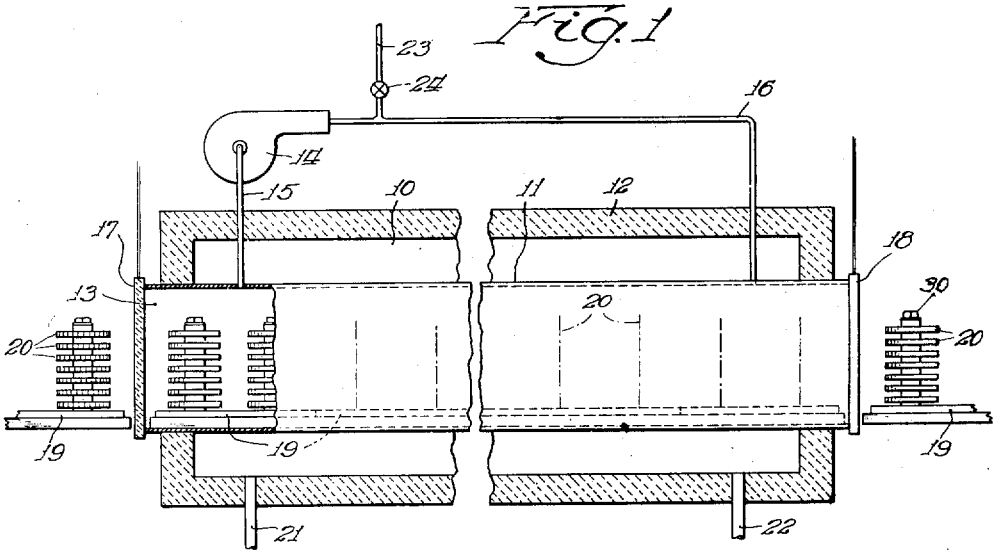
Fig. 1 is a schematic sectional view of a carburizing apparatus in which the method of the invention is illustrated as being practiced.
Figure 2:
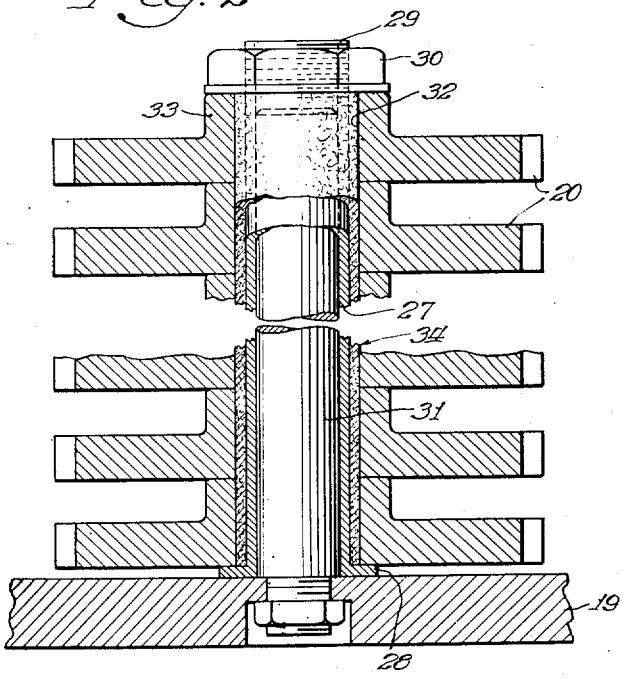
Fig. 2 is a detailed sectional view of a portion of one of the article holding trays showing the articles stacked thereon preparatory to carburizing.

In the practice of the invention, I utilize a standard carburizing furnace which may include a combustion chamber 10 formed between a muffle 11 and the outer housing 12 of the furnace. With the muffle 11 there is maintained an atmosphere 13 of carburizing fluid which is recirculated by means of a pump 14, being drawn from the forward region of the muffle through a pipe 15 and returned to the rearward region of the muffle through a pipe 16.

The carburizing atmosphere may comprise from 30% to 60% of carburizing gas, preferably in the neighborhood of 30% to 35%, from 40% to 60% hydrogen, preferably in the neighborhood of 54%, and the remainder impurities, largely composed of nitrogen entering the muffle from the external atmosphere during the periods when the end closures are open. The carburizing gas may be any gaseous hydrocarbon, such as methane, propane or butane, methane being preferred. The carburizing agent may also be liquid or solid hydrocarbon, for example, the type used in conventional case hardening operations.

The respective ends of the muffle 11 are closed by closure members 17 and 18 respectively which may be conventional vertically slidable doors adapted to be raised to allow the entrance at one end and the exit from the other end of the trays 19 and the gears 20 stacked thereon. The atmosphere 13 within the muffle is maintained at carburizing temperatures (in the neighborhood of 1700°) by combustion within the chamber 10 of a suitable fuel, preferably hydrocarbon gas, which may be introduced through fuel pipes 21 and 22 leading through the housing 12. In such atmosphere, the steel gears 20 absorb carbon from the carburizing gas, liberating hydrogen which is disposed of by combustion at the mouth of the muffle when the doors 17 and 18 are raised. Fresh carburizing gas may be introduced into the muffle to take the place of that which is consumed, by means of a charging tube 23 communicating with the tube 16 through the medium of a suitable regulating valve 24.

In accordance with the present invention, the bores 32 of the gears 20 are maintained in a sufficiently annealed condition to permit of easy machining, by inhibiting the action of the carburizing agent in the vicinity of the bores. To this end, the invention employs an inhibitor in the form of an oxygen bearing substance adapted to combine with the carbon in the carburizing agent so as to form a blanket of carbon dioxide gas protecting the surfaces of the hub bores against the effect of the carburizing agent.

The invention contemplates the employment of an inhibitor in the form of an oxide wherein the oxygen has a greater affinity for the carbon of the carburizing agent than it has for the element with which it is originally in combination. Suitable for this purpose are reducible metallic oxides capable of remaining in a solid condition at carburizing temperature. Specific examples of metallic oxides which may be successfully employed are iron oxide and copper oxide.

Iron oxide is preferred, and the preferred form thereof is forging scale.

In preparing the gears for carburizing, they are first threaded onto a core member 27 in the form of a sleeve having at its lower end a flange 28 upon which the lower gear is adapted to rest, threaded as at 29 at its upper end and provided with a nut 30 by means of which the stack of gears is secured upon the sleeve.

The stacks of gears are mounted upon trays 19 having posts 31 over which the sleeves 27 are slipped.

The external diameter of the sleeve 27 is considerably less than the internal diameter of the bores 32 of the gear hubs 33 and as the gears are threaded onto the core sleeve 27, the annular space between the sleeve and the bores 32 is filled with the inhibitor mixture 34 in the form of a sleeve lining the bores of the hubs.

It will now be apparent that as the stacks of gears are passed through the carburizing atmosphere, any carburizing gas seeping between the hubs 33 will have to pass into and through the sleeve 34 of inhibitor material in order to reach the bores 32 of the hubs. In thus passing through the inhibitor, the carburizing gas will react with the oxide particles 26 to form carbon monoxide and carbon dioxide, thus impoverishing the carburizing gas within the bores so that it will not react with the surfaces of the bores.

The scale employed may have a mesh of from ⅛ to $\frac{1}{16}$ inch. In order to readily insert the material into the space between the core sleeve 27 and bores 32, the space should be in the neighborhood of ⅛ inch thick.

The unadulterated iron oxide has proven to be satisfactory in the presence of some carburizing mediums. But in the carburizing of gears with a gaseous carburizing agent, I have experienced considerable difficulty with undercarburizing or uneven carburizing of the gear teeth. After contending with the problem for some time it was finally decided that the difficulty arose from the production of an excess volume of carbon dioxide within the bore of the gear, and the forcing of such excess outwardly through apertures between the gears formed by irregularities in the surfaces thereof, thus partially blanketing the teeth.

In attempting to confine the action of the inhibitor to the region of the bores of the hub members, it is not practicable to attempt to prevent the escape of excess carbon dioxide. In order to meet the problem, the invention reduces the inhibiting effect by diluting the oxide with a quantity of non-oxidizing material. The material preferred for this purpose is a material which will not react with the metal of the gear to any substantial extent, as, for example, iron in comminuted form, preferably milling machine cuttings. Such cuttings, as well as forging scale, are available in the average machine shop as waste products. The cuttings are preferably from a steel of low carbon content.

The iron filings present a large surface upon which any carburizing effect that the gas may be able to develop over the inhibiting effect of the iron oxide, will be largely dissipated before the gas comes in contact with the bore of the gear. Thus the iron may be effective to reduce to some extent the activity of the carburizing gas within the bore without devoloping CO or $CO_2$. However, the comminuted iron alone, without the iron oxide, will not satisfactorily achieve the object of the invention. Substantially, the iron may be considered as an inert material functioning as a diluent, and the invention contemplates the use of other substances which are inert at carburizing temperatures, as, for example, sand or comminuted glass.

Figure 3:
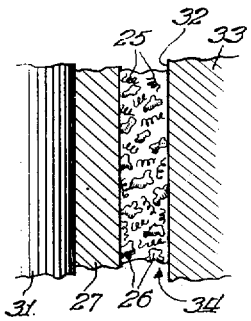
Fig. 3 is an enlarged detailed sectional view of a portion of the sleeve of inhibiting material which is employed to line the bores of the gear hubs in order to inhibit the carburizing effect therein.

The mixture of iron cuttings and scale is shown in Fig. 3, the iron cuttings being indicated at 25 and the scale at 26.

The percentage of metal oxide and diluent may vary in accordance with the conditions under which the carburizing is performed. Such conditions may vary with the use of different carburizing agents, the spacing between stacks of gears, the rapidity of movement of the carburizing atmosphere, etc. The invention aims to obtain a balance between the oxide and the inert material, wherein there is just sufficient oxide to inhibit carburizing within the bores of the gears but not enough to throw out an excess of $CO_2$.

Best results have been secured by employing about 50% oxide and 50% diluent. Good results may be obtained, however, within the range from 80% diluent and 20% oxide to 25% diluent and 75% oxide.

The work is maintained in the carburizing atmosphere a normal carburizing period, which may range from 14 to 16 hours, and is then discharged and lowered into a quenching bath, whence it is carried through a cleaning bath and a tempering furnace.

I claim:

1. The steps in the method of carburizing articles of steel having a bore, said articles being stacked together so that their bores collectively form a chamber, which method includes: introducing into the said chamber a mixture of comminuted iron and iron oxide in the proportion of 80 to 25% iron and 20 to 75% iron oxide, providing closure means closing said chamber, and maintaining such mixture in contact with the surfaces of the bores while passing the articles through a carburizing atmosphere.

2. The steps in the method of carburizing articles of steel having a bore, said articles being stacked together so that their bores collectively form a chamber, which method comprises introducing into the said chamber a mixture of approximately 50% comminuted iron and 50% iron oxide in the form of forging scale, providing closure means closing said chamber, and maintaining such mixture in contact with the surfaces of the bores to inhibit the carburizing effect on said surfaces while passing the articles through a carburizing atmosphere.

3. The steps in the method of carburizing articles of steel having a bore, said articles being stacked together so that their bores collectively form a chamber, which method includes introducing into said chamber a mixture of comminuted iron and iron oxide in a proportion of 80 to 25% iron and 20 to 75% iron oxide, providing closure means closing said chamber, and maintaining such mixture in proximity to the surfaces of the bores while passing the articles through a carburizing atmosphere.

ERNEST F. DAVIS.